2 Sheets--Sheet 1.

J. H. SMITH.
Binders' Tables for Harvesters.

No. 135,168. Patented Jan. 21, 1873.

Witnesses:
A. Bezmerkendorf.
Sedgwick

Inventor:
J. H. Smith
PER Munn & Co.
Attorneys.

J. H. SMITH.
Binders' Tables for Harvesters.

No. 135,168.  Patented Jan. 21, 1873.

UNITED STATES PATENT OFFICE.

JAMES H. SMITH, OF ORFORD, IOWA.

IMPROVEMENT IN BINDERS' TABLES FOR HARVESTERS.

Specification forming part of Letters Patent No. 135,168, dated January 21, 1873.

*To all whom it may concern:*

Be it known that I, JAMES H. SMITH, of Orford, in the county of Tama and State of Iowa, have invented a new and Improved Combined Binders' Table and Bundle-Carrying Attachment to Harvesters, of which the following is a specification:

My invention consists in converting the tables combined with a binding-trough and platform for a harvester attachment for binding grain into a bundle carrying and dumping attachment, the tables being hinged to the binding attachment and connected with tilting-levers peculiarly arranged, whereby the bundles may be dumped upon the ground by the driver when a quantity sufficient for a shock has accumulated.

Figure 1:
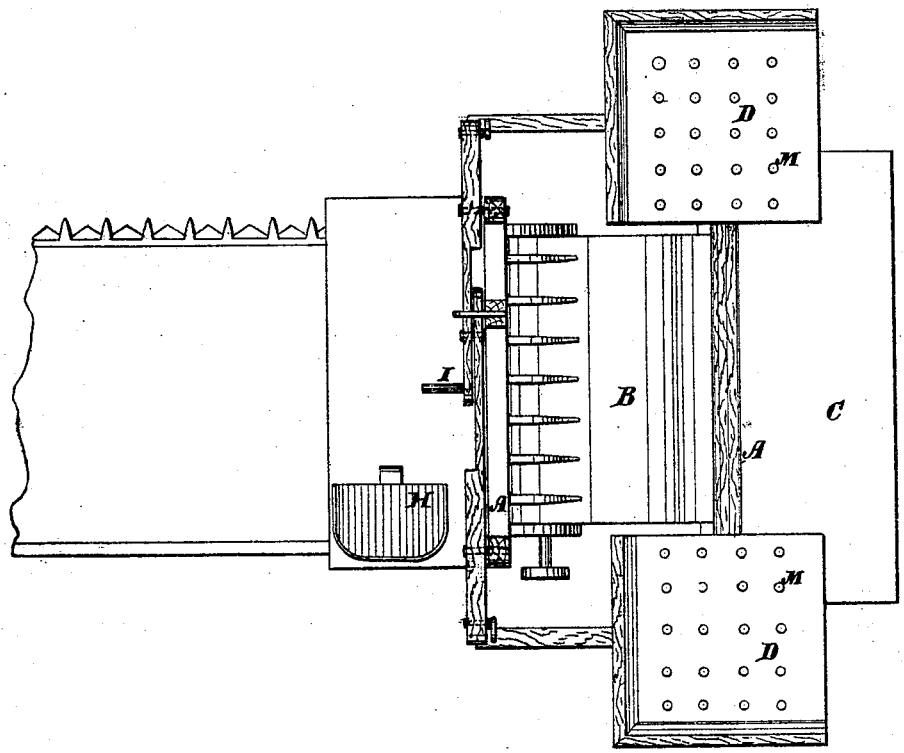
Figure 2:
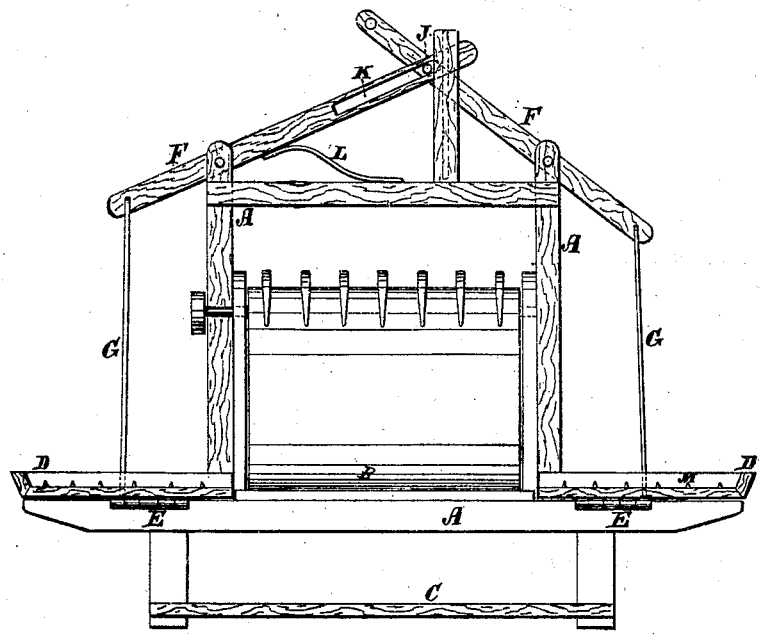
Figure 3:
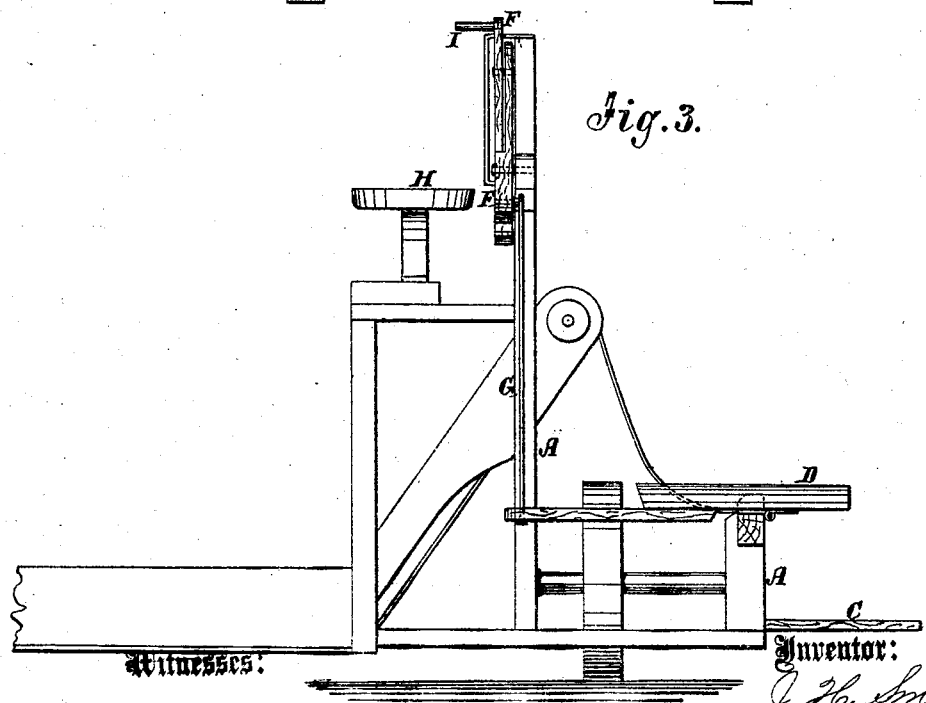

Figure 1 is a plan view of a binding attachment to harvesters and my improved tilting-tables. Fig. 2 is a side elevation, and Fig. 3 is a rear elevation.

Similar letters of reference indicate corresponding parts.

A is the frame for supporting the binding attachment; B, the trough; C, the platform whereon the operator stands; and D, the tables for receiving and carrying the bundles, and whereon they are bound. These tables I propose to make much larger than heretofore, and to hinge them, as shown at E, so that they can be used to hold and carry the bundles and tilted to dump them; and I connect them to the tilting-levers F, pivoted to an extension of the frame above the carrier by rods G. This extension of the frame is arranged by the side of the seat H, where the levers, or one of them, which is provided with a handle, I, can be conveniently reached by the driver to tilt the tables. Said levers are connected together by a pin, J, in one and the slot K in the other, so that both are actuated by one and the same operation of the handle I. The spring L is arranged with one lever to throw the tables back after being tilted. The tables have numerous stud-pins, M, projecting upward to hold the bundles, so that they will not be shaken off while being carried to accumulate a sufficient quantity for a shock.

By this contrivance the labor of gathering single bundles together in shocks by hand is saved.

Having thus described my invention, I claim as new and desire to secure by Letters Patent—

1. The hinged binding-tables D, rods G, and levers F F, connected by slot and pin, arranged on the frame A, with reference to the trough B and platform C, as shown and described, to adapt them to operate in the manner set forth.

2. The dumping-tables provided with stud-pins to hold the bundles, so that they will not be shaken off while being carried, substantially as specified.

JAMES H. SMITH.

Witnesses:
  HOMER S. KELLY,
  J. L. McNAIR.